Patented Mar. 31, 1936

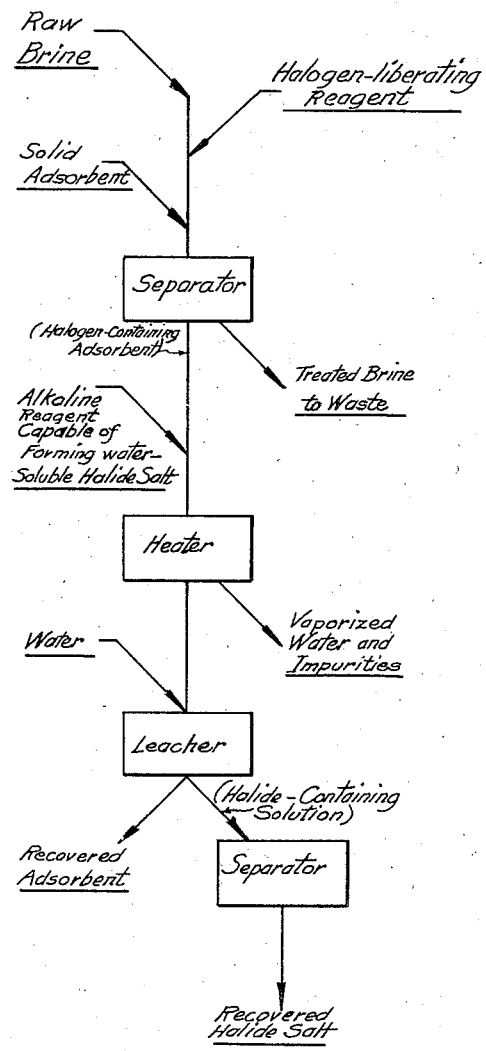

2,035,523

UNITED STATES PATENT OFFICE 2,035,523

PROCESS OF RECOVERING HALIDES

Harry E. Bierbaum, Long Beach, Calif., assignor to General Salt Company, Ltd., Long Beach, Calif., a corporation of California Application August 6, 1934, Serial No. 738,682

7 Claims. (Cl. 23—217)

This invention relates to the recovery of halides, and particularly to processes for the recovery of iodides or other halides from oil-fields brines or other solutions containing a halogen in either combined or elementary form, in which the solution is first treated, if necessary, to convert chemically combined halogen to the form of free or elemental halogen, after which the halogen is adsorbed on charcoal or other suitable adsorbent agent and is then converted by suitable chemical treatment into a soluble halide salt or compound which is subsequently dissolved from the adsorbent agent and recovered by further treatment of the resultant liquor. The invention is particularly directed to the recovery of a halide from a brine or other solution containing a halogen in the presence of organic impurities. The presence of such impurities has been found to be quite disadvantageous in the commercial operation of such processes, since these impurities are largely adsorbed in the adsorbent agent, along with the halogen, and are subsequently removed therefrom with the halide compound, resulting in the production of an impure halide product, a reduction in the yield obtainable, and in certain operating difficulties.

It has been hitherto proposed to partially overcome these disadvantages by the removal of such impurities through suitable purification treatment, such treatment being applied either to the brine or solution prior to the adsorption step, or to the halide-containing liquor obtained by chemical treatment and leaching of the halogen-containing adsorbent agent. Such purification methods, however, have not only added an additional step or steps to the process but have failed to effect a complete removal of the above-described impurities so that, at best, only a partial elimination of the above-mentioned disadvantageous process characteristics has been obtained.

The principal object of this invention is to provide a new method of recovering halides, in which said organic impurities are removed in a novel and advantageous manner.

A particular object of the invention is to obtain a substantially complete elimination of such impurities, prior to the leaching or solution of the halide compound or salt from the adsorbent agent, so as to entirely eliminate the presence of these impurities in the succeeding steps of the process and thus eliminate the attendant operating difficulties.

A further object of the invention is to permit the use of a smaller amount of water than heretofore required for leaching the halide salt or compound from the adsorbent agent and thus obtain a more concentrated halide-containing liquor and minimize the amount of evaporation required to concentrate said liquor sufficiently to produce crystallization of the halide therefrom.

A further object of the invention is to obtain a high yield of halide, due to a high percentage removal of the halide salt or compound from the adsorbent agent in the leaching operation and to a high percentage recovery of the halide from the leached liquor. A further increase in yield is obtained, due to the fact that the purification method of the present invention leads to the recovery of halogen contained in organic halogen compounds adsorbed in the adsorbent agent.

A further object of the invention is to reactivate or improve the adsorbent properties of the adsorbent agent remaining after leaching of the halide salts or compounds therefrom. Since economical operation of a process of the type above described demands that the adsorbent be repeatedly re-used for adsorption of halogen from further quantities of brine or solution, it will be obvious that the improvement in the adsorbent properties of the recovered adsorbent agent thus effected will enable a higher recovery of halogen by adsorption in the re-used agent, or a reduction in the amount of such agent required. Furthermore, the settling of the adsorbent from the brine or solution, following the adsorption step, is rendered more rapid and complete, due to the improvement in physical properties thereof.

In the process of the present invention, the elimination of organic or volatile impurities is effected by heating the adsorbent mass, following the adsorption of halogen therein and the chemical treatment for conversion of the halogen to a substantially non-volatile halide salt, to a sufficient temperature to eliminate organic impurities, together with any other volatile impurities which may be present, after which the halide salt may be leached from the adsorbent mass, and the resultant solution treated to recover a halide therefrom.

The chemical treatment to which the adsorbed halogen is subjected, prior to the heating operation for removal of organic impurities, consists in treatment with a reagent adapted to react with elemental halogen to form a substantially non-volatile halide, that is, a halide which is substantially non-volatile at the temperature employed in said heating operation; according to a preferred embodiment of the process, the chemical treatment serves to convert the halogen to a water-soluble halide, so that the recovery thereof from the adsorbent, following the heating operation, may be effected by a water-washing or leaching of the adsorbent mass.

When charcoal is used as the adsorbent agent, heating of the adsorbent mass is preferably conducted in an enclosed chamber, by application of indirect heat, with the substantial exclusion of oxygen, whereby oxidation of the charcoal itself is prevented. The character of the heating is such that a decomposition or destructive distillation of the organic impurities is obtained, without dissociation or volatilization of the halide salt or compound present. Impurities of an oily nature, as well as other organic impurities present in the charcoal mass, are eliminated by such heat treatment, either by volatilization, or by conversion thereof into coke or other solid carbonaceous residuum in substantially insoluble state deposited on the charcoal. It has been found practical to heat the charcoal mass to a temperature between 400° and 500° F. or higher, which produces substantially complete elimination of organic impurities, without loss of halogen by decomposition or volatilization of the halide salt or compound.

If desired, the heating may be conducted under superatmospheric or sub-atmospheric pressure conditions, but it has been found quite practical to conduct the heating at ordinary atmospheric pressures. The volatile organic impurities removed from the charcoal mass by heating, may be recovered, if desired, by condensation, absorption, chemical treatment or in any other suitable manner.

In the treatment of oil-field brines by charcoal adsorption methods, a considerable amount of organic matter is picked up by the adsorbent charcoal and while some of the halogen may be present in the charcoal in combination with organic matter, the treatment used for conversion of the halogen to non-volatile salts will, in general, cause the principal proportion of such halogen to be taken out of combination with the organic matter, but the organic matter itself remains, and the present disclosed treatment of the charcoal mass after the chemical conversion of the adsorbed elemental halogen to halide serves to remove the organic matter bodily, or at least convert it into a state which does not interfere with the halide recovery in the subsequent steps of the process.

After the heat treatment is completed, and the organic impurities substantially completely eliminated, the remaining charcoal mass is subjected to further treatment for the recovery of the halide salt or compound therefrom. For example, if the halogen has been converted into a water-soluble halide, it may be recovered by washing or leaching with water, concentrating the resulting solution if necessary, as by evaporation of water therefrom, and then cooling to cause crystallization of said halide.

The accompanying drawing is a diagrammatic flow sheet illustrating the several steps of the present process, from the supply of raw brine to the recovery of the desired halide and the adsorbent agent.

As an example of the application of the present invention to the commercial recovery of an iodide from oil-field brines, with reference to said drawing, the brine is first treated to convert any combined iodine for example, iodine combined as sodium iodide or other metal iodide, into elemental iodine, for example, by acidification and oxidation in any well-known manner, and adsorbent charcoal is then added for the purpose of taking up the iodine. This charcoal containing adsorbed iodine is separated from the brine by settling or filtration, and is then treated with a reagent capable of reacting with the iodine to form a water-soluble substantially non-volatile iodide salt or compound, for example, with an aqueous solution of an alkali, such as caustic soda, caustic potash, or alkali-metal carbonate, which reacts with the iodine to form an iodide of the alkali-metal present in said reagent, as described, for example, in Ellinger patent No. 1,810,039.

Hitherto it has been customary to digest the charcoal with such an alkaline solution and then subject the mass to filtration and washing with water to extract the soluble iodide salt from the charcoal. This procedure succeeds in converting the iodine into the desired water-soluble salt, but a considerable amount of organic matter is also caused to enter the water, either in solution or in suspension, and is thus caused to be present during the subsequent steps for recovery of the iodide in commercially marketable form. According to a preferred embodiment of the present invention, the charcoal mass, following treatment with an aqueous alkaline solution such as above mentioned to convert the iodine to an iodide, is subjected to the heating operation above described to remove organic impurities or convert them into such condition that they will not interfere with the subsequent recovery of the halide. This may advantageously be accomplished by making the charcoal into a slurry with the alkaline solution, and then evaporating the moisture from the slurry, after which the mass may be heated to a suitable temperature, such as approximately 450° F. or higher, in an enclosed chamber with exclusion of oxygen, and the organic matter eliminated. Only a slight excess over the theoretical amount of such alkali is required for the conversion reaction, due to the fact that as the slurry is evaporated to dryness a concentration of unreacted alkaline solution is continually obtained, and thus the conversion reaction can progress to the desired end without requiring that a large amount of reagent be kept in solution. It has been found that the reaction with an alkaline reagent such as above mentioned, in the presence of the adsorbent charcoal mass, causes the adsorbed halogen to be converted almost wholly to the form of an alkali metal iodide, with little or no formation of iodate. If desired, however, a small amount of suitable reducing agent, such as sodium sulphite, may be used in the reaction, in order to insure complete conversion of the iodine to the form of an iodide.

Any suitable form of apparatus may be employed for the heating operation, but I prefer to use an apparatus which provides for evaporation of the slurry to dryness under conditions of agitation, and which is adapted for proper heating of the dried mass to the desired temperature while providing for suitable heat-transfer through the mass for uniform heating. The apparatus should provide for the substantial exclusion of oxygen during the heating operation when charcoal is employed as the adsorbent agent, and should preferably also provide for agitation of the mass to prevent caking and occlusion of volatilized impurities.

After the heating operation, the charcoal, which now contains substantially only the iodide salt and that portion of the organic matter which has been converted to coke or the like, is subjected to a water leaching operation. It has been found that only about one-half the hitherto-required amount of water is necessary for this leaching operation, which effects a further economy in operation in view of the fact that it is generally necessary to evaporate the liquor obtained by leaching, to obtain a concentration of the iodide salt therein, before proceeding further with the process. It is believed that the leaching operation requires less water than has been hitherto considered necessary for the reason that substantially no organic impurities are present in the charcoal mass. It has been noted that considerably more water than a theoretical consideration would call for has been hitherto necessary for leaching of the charcoal mass, and the logical assumption is that the organic matter present has acted to mechanically interfere with the leaching action. The fact that only a slight excess of the alkaline reagent remains in the charcoal mass after the heating operation according to the present invention, may also contribute to the ease of leaching.

The leached charcoal is preferably used for further adsorption of iodine from the brine, and it has been found that this charcoal is materially more adsorptive than charcoal which has been leached as above described without removal of the organic matter by heating. This appears quite logical in view of the fact that any organic matter present in the charcoal will necessarily seriously interfere with subsequent adsorption and will diminish the adsorptive power thereof, and removal of the organic matter from the charcoal in the present described manner acts to revivify the charcoal and thus enable the same to take up further quantities of iodine. It has been found that charcoal recovered in the manner herein set forth may be re-used a materially greater number of times before becoming worthless for adsorption use, than has been hitherto possible. This feature of the present process adds still another economy in operation.

The liquor obtained by leaching the heated charcoal is then treated to recover the iodide salt therefrom, for example, as NaI or KI. For example, the liquor may first be concentrated by evaporation, and then cooled to about atmospheric temperature or below, to cause crystallization of said iodide salt, which may then be separated from the solution mechanically, as by filtering, settling, or centrifuging.

While the above specific embodiment of the present invention is directed to the recovery of an iodide from oil-field brines, it will be apparent that this invention is applicable to the recovery of other halides such as for example, a bromide, from any brine or liquor which is contaminated with organic matter.

I claim:

1. In a process for recovering a halide from a halogen-containing solution, the steps which comprise: adsorbing elemental halogen from such a solution on an adsorbent agent; treating said adsorbent agent containing adsorbed halogen with an aqueous solution of an alkaline material in slight excess over the theoretical amount required for conversion of said halogen into a water-soluble halide salt; forming a slurry containing said adsorbent agent and said halide salt; reducing said slurry to a dry mass; heating said mass to eliminate organic impurities therefrom; leaching said mass with water to separate said halide salt from said adsorbent agent and obtain an aqueous solution of said salt; concentrating said aqueous solution and cooling the same to cause crystallization of said halide salt; and separating said halide salt from the solution.

2. The invention set forth in claim 1 and comprising in addition: re-using said adsorbent agent obtained by said leaching operation in the adsorption of further quantities of halogen.

3. In a process for recovering an iodide from an iodine-containing solution, the steps which comprise: adsorbing elemental iodine from such a solution on charcoal; treating said charcoal containing adsorbed iodine with an alkaline reagent in slight excess over the amount theoretically required to convert said iodine into a water-soluble iodide salt; forming a slurry containing said charcoal and said iodide salt; reducing said slurry to a dry mass; heating said mass in the substantial absence of oxygen to eliminate organic impurities therefrom; separating said iodide salt from said charcoal by leaching with water; concentrating the resulting solution and cooling the same to cause crystallization of said iodide salt; and separating said iodide salt from the solution.

4. The invention set forth in claim 3, and comprising in addition: re-using the charcoal separated from said water-soluble iodide salt by the leaching operation, for the adsorption of further quantities of elemental iodine.

5. In a process for recovering a halide from a halogen-containing solution, the steps which comprise: adsorbing elemental halogen from such a solution on an adsorbent agent; contacting said adsorbent agent containing adsorbed halogen with an aqueous solution of an alkaline material to convert the halogen to a water-soluble halide salt and form a wet mixture containing said adsorbent and said halide salt; heating said mixture to dry the same and eliminate organic impurities therefrom while retaining said adsorbent and said halide salt in the dried mixture; leaching the dried mixture with water to dissolve said halide salt and form an aqueous solution containing said salt, and treating said solution to recover said halide salt therefrom.

6. In a process for recovering a halide from a halogen-containing solution, the steps which comprise: adsorbing elemental halogen from such a solution on adsorbent charcoal; contacting said adsorbent charcoal containing adsorbed halogen with an aqueous solution of an alkaline material to convert the halogen to a water-soluble halide salt and form a wet mixture containing said charcoal and said halide salt; heating said mixture in the substantial absence of oxygen to dry the same and eliminate organic impurities therefrom while retaining said charcoal and said halide salt in the dried mixture; leaching the dried mixture with water to dissolve said halide salt and form an aqueous solution containing said salt, and treating said solution to recover said halide salt therefrom.

7. The invention set forth in claim 6, and comprising in addition: re-using said adsorbent charcoal, obtained by the step of leaching said dried mixture with water, in the adsorption of a further quantity of halogen.

HARRY E. BIERBAUM.